(12) United States Patent
Jilani et al.

(10) Patent No.: US 10,541,424 B2
(45) Date of Patent: Jan. 21, 2020

(54) POLAR PLATE ASSEMBLY FOR A FUEL CELL AND AN INDIVIDUAL CELL

(71) Applicants: VOLKSWAGEN AG, Wolfsburg (DE); AUDI AG, Ingolstadt (DE)

(72) Inventors: Adel Jilani, Burnaby (CA); Sanjiv Kumar, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 113 days.

(21) Appl. No.: 15/821,518

(22) Filed: Nov. 22, 2017

(65) Prior Publication Data
US 2018/0159140 A1 Jun. 7, 2018

(30) Foreign Application Priority Data
Nov. 23, 2016 (DE) .................. 10 2016 122 587

(51) Int. Cl.
| | | |
|---|---|---|
| *H01M 4/88* | (2006.01) | |
| *H01M 8/0267* | (2016.01) | |
| *H01M 8/0273* | (2016.01) | |
| *H01M 8/0258* | (2016.01) | |
| *H01M 8/1004* | (2016.01) | |
| H01M 8/1018 | (2016.01) | |

(52) U.S. Cl.
CPC ....... *H01M 4/8807* (2013.01); *H01M 8/0258* (2013.01); *H01M 8/0267* (2013.01); *H01M 8/0273* (2013.01); *H01M 8/1004* (2013.01); H01M 2008/1095 (2013.01)

(58) Field of Classification Search
CPC ............. H01M 4/8807; H01M 8/0267; H01M 8/0273; H01M 8/0258; H01M 8/1004; H01M 2008/1095
See application file for complete search history.

(56) References Cited

U.S. PATENT DOCUMENTS

| 6,007,933 | A | 12/1999 | Jones | |
|---|---|---|---|---|
| 2010/0062302 | A1* | 3/2010 | Bae ...................... | H01M 8/0297 429/444 |
| 2010/0209801 | A1* | 8/2010 | Gemba ............... | H01M 8/0258 429/467 |

* cited by examiner

*Primary Examiner* — Muhammad S Siddiquee
(74) *Attorney, Agent, or Firm* — Seed Intellectual Property Law Group LLP

(57) ABSTRACT

The invention relates to a polar plate assembly for a fuel cell, comprising: a polar plate which comprises, on at least one of its flat sides, elevations and free spaces arranged between them, which form a flow structure for a reactant; and a supporting structure designed to prevent or at least reduce an intrusion by a gas diffusion layer adjacent to the supporting structure and/or a membrane electrode assembly into the free spaces of the flow structure. It is provided that the polar plate assembly is designed such that the polar plate protrudes into the supporting structure. The invention furthermore relates to an individual cell with a polar plate assembly according to the invention.

8 Claims, 6 Drawing Sheets

POLAR PLATE ASSEMBLY FOR A FUEL CELL AND AN INDIVIDUAL CELL

BACKGROUND

Technical Field

The invention relates to a polar plate assembly for a fuel cell. The polar plate assembly comprises polar plate which comprises, on at least one of its flat sides, elevations and free spaces arranged between them, which form a flow structure for a reactant. The polar plate furthermore comprises a supporting structure designed to prevent or at least reduce an intrusion by a gas diffusion layer adjacent to the supporting structure and/or a membrane electrode assembly into the free spaces of the flow structure. The invention furthermore relates to an individual cell comprising such a polar plate assembly.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in the stack (fuel cell stack) whose electrical power outputs accumulate. Bipolar plates (also called flow field plates or separator plates), which ensure a supply of the individual cells with the operating media, i.e., the reactants, and which are usually also used for cooling, are generally arranged between the individual membrane electrode assemblies. In addition, the bipolar plates also ensure an electrically conductive contact to the membrane electrode assemblies.

During operation of the fuel cell, the fuel (anode operating medium), in particular hydrogen $H_2$ or a hydrogen-containing gas mixture, is fed via an anode-side open flow field of the bipolar plate to the anode where electrochemical oxidation of $H_2$ to protons $H^+$ takes place with release of electrons ($H_2 \rightarrow 2 H^+ + 2 e^-$). A (water-bound or water-free) transport of the protons from the anode chamber into the cathode chamber is carried out via the electrolyte or the membrane, which separates the reaction chambers from each other in a gas-tight and electrically insulated manner. The electrons provided at the anode are guided to the cathode via an electrical line. The cathode receives, as cathode operating medium, oxygen or a gas mixture containing oxygen (such as air) via an open flow field of the bipolar plate on the cathode side so that a reduction of $O_2$ to $O^{2-}$ with gain of electrons takes place ($½ O_2 + 2 e^- \rightarrow O^{2-}$). At the same time, the oxygen anions react in the cathode chamber with the protons transported across the membrane to form water ($O^{2-} + 2 H^+ \rightarrow H_2O$).

At the stack ends of the fuel cell stack, so-called monopolar plates, which only comprise a flow field on a side facing the fuel cell stack, are arranged instead of the bipolar plates. Overall, bipolar plates and monopolar plates can be combined under the term "polar plates."

The fuel cell stack is supplied with its operating media, that is the anode operating gas (hydrogen for example), the cathode operating gas (air for example), and the coolant by means of the main supply channels, which run through the stack in its entire stack direction and from which the operating media are supplied to the individual cells via the bipolar plates. There are at least two such main supply channels available for each operating medium, namely one for supplying and one for discharging the respective operating medium.

Generally, a membrane electrode assembly comprises a film frame which frames the membrane with the electrodes. This allows limiting the membrane and the electrodes to the active area in order to save material costs of the relatively expensive membrane and electrodes. The mostly thermoplastic films of the film frame are however prone to creepage and therefore restrict the channels of so-called distributor areas of the bipolar plates. Duroplastic films (frame) can also be used but are more complex to handle.

It is furthermore known that the membrane of the membrane electrode assembly extends to the edge of the bipolar plate and that seals on the adjacent bipolar plates seal toward the membrane or that seals are arranged directly on the membrane and seal toward the bipolar plates. The mentioned problem that the membranes creep into the channels of the distributor areas and accumulation areas over time also exists in this case.

In the active area, the gas diffusion layers arranged between the membrane electrode assemblies and the bipolar plates prevent the membrane electrode assemblies from restricting channels of the flow field in the active area. Since the fuel cell stack is however pressed in the stack direction, the gas diffusion layers are pushed into the channels of the flow field, which also results in the channels being restricted.

U.S. Pat. No. 6,007,933 A discloses supporting structures in the form of lattices arranged between the gas diffusion layers and bipolar plates of a fuel cell stack. In this case, the supporting structures form a field of regularly arranged openings for allowing reactants to pass through. Strips arranged between the openings bring about that the gas diffusion layers only intrude into the openings of the supporting structures but not (or only slightly) into the channels of the bipolar plates. However, it has been shown to be disadvantageous that ohmic losses occur as a result of the supporting structure.

BRIEF SUMMARY

The invention is now based on the task of proposing a polar plate assembly with a supporting structure that is further improved with respect to the prior art.

This task is achieved by a polar plate assembly for a fuel cell and a fuel cell stack having the features of the independent claims.

The polar plate assembly for a fuel cell comprises
 a polar plate which comprises, on at least one of its flat sides, elevations and free spaces arranged between them, which form a flow structure for a reactant, and
 a supporting structure designed to prevent or at least reduce an intrusion by a gas diffusion layer adjacent to the supporting structure and/or a membrane electrode assembly into the free spaces of the flow structure.

It is provided that the individual cell assembly is designed such that the polar plate protrudes into the supporting structure.

Depending on the embodiment of the invention, the polar plate protruding into the supporting structure improves the stability of the polar plate assembly and brings about a space savings and/or a reduced electrical resistance. The polar plate assembly can also be called a "polar plate assembly group," "polar plate with a supporting structure," or "separator plate with a supporting structure."

In the past, a channel width was often limited by a membrane electrode assembly delamination as a higher compression between the elevations was not possible. As a result of the supporting structure, free spaces, in particular channels, can be designed to be wider, which reduces a pressure loss. An intrusion by the gas diffusion layer and/or membrane electrode assembly is furthermore minimized. A compression of the membrane electrode assembly between the elevations is moreover improved, which reduces losses. The fuel cell is furthermore stiffened.

The flow structure generally serves to guide the reactant across the surface of the polar plate and to distribute it evenly on the polar plate. The flow structure can in particular be designed such that the free spaces form channels. Alternatively, the elevations can also form nubs, for example.

The supporting structure can prevent or at least reduce an intrusion by the gas diffusion layer and/or the membrane electrode assembly into the free spaces of the flow structure by the supporting structure preferably comprising supporting means, i.e., for example strips, supports or similar, which cover the free spaces at least partially. To this end, the supporting structure is arranged on an outside of the polar plate, in particular to an outside of the flow structure. The polar plate protrudes into the supporting structure; the polar plate in particular protrudes through the supporting structure, which can increase the effects according to the invention.

The supporting structure is preferably a separate component; it then abuts against the polar plate; it can however also be part of the plate design. The supporting structure in particular constitutes a separate layer, in particular a plate (a supporting plate or stiffening plate). The supporting structure is thus arranged within an individual cell between the polar plate and the gas diffusion layer and/or the membrane electrode assembly. Only slight adaptations of the polar plate, if any, are necessary. In this case, the supporting structure preferably directly abuts against the polar plate on the one hand and against the gas diffusion layer and/or the membrane electrode assembly on the other hand.

It is preferably provided that the supporting structure is embedded into the polar plate, whereby a compact polar plate assembly is achieved. According to a preferred embodiment of the invention, it is additionally provided that the elevations comprise depressions on which the supporting structure rests.

It is preferably provided that the supporting structure comprises these penetrating contact openings into which the elevations of the flow structure protrude. Provided thus are, in particular separate, openings which are used so that the elevations of the flow structure directly contact the gas diffusion layer and/or the membrane electrode assembly.

It is preferably provided that the edges of the contact openings circumferentially rest on the depressions of the elevations. A particular stable rest of the supporting structure is thus realized on the depressions in a stack direction of the fuel cell stack.

It is preferably provided that subregions of the elevations, which subregions protrude into the contact openings, respectively form a circumferential form fit with the surrounding contact openings. Thus, a sliding of the supporting structure in all directions orthogonal to the stack direction is prevented within the fuel cell stack. In this case, a form fit denotes a connection established by at least two connection partners interlocking. In this way, the connection partners cannot disconnect even if there is no force transmission or if the force transmission is interrupted. The bipolar plate is furthermore stiffened thereby; the bending stiffness is in particular improved.

It is preferably provided that the elevations of the polar plate are flush with a side of the supporting structure facing away from the polar plate. This ensures a flat surface for resting the gas diffusion layer and/or the membrane electrode assembly.

A preferred embodiment of the invention provides that the supporting structure comprises supporting means designed to bridge the free spaces at least partially. The supporting means in particular bridge the free spaces completely from one elevation to an (in particular directly) adjacent elevation. The supporting means thus separate the reactant openings from one another. Within the fuel cell, the reactant openings fluidically connect the free spaces of the flow structure of the polar plate to the gas diffusion layer and/or the membrane electrode assembly. A function separation thus takes place between the contact openings and the reactant openings, which serve to conduct a reactant through the supporting structure. The supporting means are thus in particular arranged along the length of a free space designed as a channel. By means of a suitable arrangement of supporting means, the membrane electrode assembly delamination is nearly eliminated.

It is preferably provided that the flow structure forms channels and the supporting means extend orthogonally to a channel direction (i.e., orthogonally to a longitudinal progression) of the channels, whereby an optimum utilization of material is given.

It is preferably provided that the flow structure forms channels and the supporting means are arranged one after the other along a longitudinal progression of the channels. The arrangement thus corresponds in particular to an alternating sequence of openings and supporting means along the longitudinal progression of the channels. This is in particular the case over the entire length of the channels. This ensures that the supporting means and reactant openings are also arranged precisely where the flow structure comprises free spaces.

The supporting structure is preferably designed as a lattice. In this case, the lattice in particular comprises the contact openings and reactant openings. Such a lattice can easily be realized by punching, for example.

The supporting structure is preferably an integral component of the polar plate. The polar plate and the supporting structure are thus integrally designed. This can, for example, be the case if the supporting structure is bonded with the polar plate (i.e., connected by atomic or molecular forces), for example welded or glued.

The polar plate is preferably a bipolar plate. As a result, the polar plate comprises flow structures arranged on both sides. The polar plate can moreover also be a monopolar plate with a flow structure arranged on only one side, as is provided, for example, at the ends of a fuel cell stack. Two single plates, which together form a bipolar plate, can also be called polar plates.

The polar plate assembly preferably respectively comprises a supporting structure on its two opposite flat sides. An intrusion by a gas diffusion layer adjacent to the supporting structure and/or by a membrane electrode assembly into the free spaces of the flow structure is thus prevented or at least reduced on both sides of the polar plate assembly.

According to another aspect of the invention, an individual cell is provided, comprising
- a membrane electrode assembly with a membrane and electrodes arranged planarly on both sides of the membrane,
- a polar plate assembly according to the invention, and
- a gas diffusion layer extending between the membrane electrode assembly and the polar plate.

During operation of the individual cell, an intrusion by a gas diffusion layer adjacent to the supporting structure and/or by a membrane electrode assembly into the free spaces of the flow structure is prevented or at least reduced by the polar plate assembly according to the invention.

A preferred embodiment of the invention provides that the polar plate assembly is designed such that the polar plate directly contacts the gas diffusion layer and/or the membrane electrode assembly through the supporting structure. This prevents ohmic losses as a result of an otherwise electrically interposed supporting structure. This is the case since the polar plate directly (i.e., without interposed components) contacts the gas diffusion layer and/or the membrane electrode assembly without a separate supporting structure as in individual cell assemblies.

The gas diffusion layer generally extends along an active area of the membrane electrode assembly. No gas diffusion layer is in particular present outside the active area, whereby construction height is saved and/or more space is available for distributor areas. The distributor area or accumulation area connects a flow field of the polar plate in the active area to a supply opening penetrating through the polar plate. The flat sides generally denote two opposite sides of the polar plate, which sides comprise the largest areal extent.

The membrane electrode assembly preferably comprises a film frame with a central opening, wherein the film frame circumferentially surrounds the membrane of the membrane electrode assembly in an overlapping manner. An intrusion by the film frame into the free spaces of the flow structure thus is in particular prevented. This is in particular the case in a flow structure of the polar plate designed as a distributor area.

It is preferably provided that the free spaces are designed as channels, which are separated from one another by elongate elevations, wherein, within the individual cell, several elongate elevations on the anode side stand opposite a channel on the cathode side. The compression of the membrane electrode assembly is further increased thereby.

A fuel cell stack with several stacked individual cell assemblies, i.e., assemblies arranged in a row on the flat sides of the fuel cell, is furthermore provided according to the invention. The fuel cell stack according to the invention is characterized in particular by an increased efficiency as a result of its reduced ohmic losses. The fuel cell stack is in particular a part of a fuel cell system comprising an anode supply and a cathode supply with corresponding peripheral components in addition to the fuel cell stack.

Furthermore provided is a vehicle comprising a fuel cell stack according to the invention. The vehicle is preferably an electric vehicle in which an electrical energy generated by the fuel cell system serves to supply an electric traction motor and/or a traction battery.

Additional preferred embodiments of the invention arise from the other features mentioned in the dependent claims.

The various embodiments of the invention mentioned in this application may be combined advantageously with one another unless stated otherwise in individual cases.

BRIEF DESCRIPTION OF THE SEVERAL VIEWS OF THE DRAWINGS

The invention is explained below in exemplary embodiments on the basis of the respective drawings. The following is shown.

DETAILED DESCRIPTION

Figure 1:
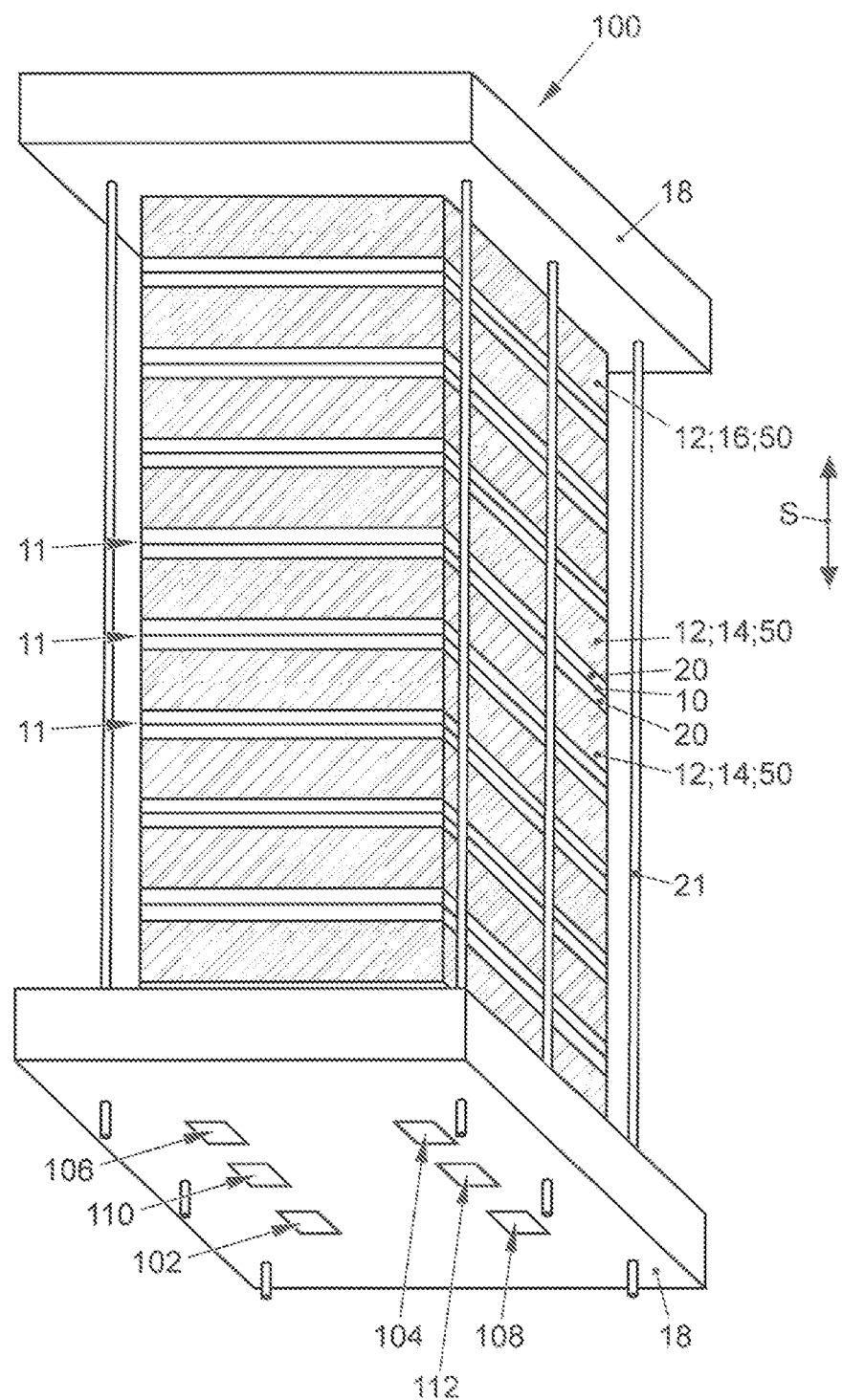
FIG. 1 shows a schematic illustration of a fuel cells tack according to a preferred embodiment.

FIG. 1 shows a schematic illustration of a fuel cell stack, denoted overall by 100, according to a preferred embodiment of the present invention. The fuel cell stack 100 is part of a vehicle (not shown), in particular an electric vehicle, which has an electric traction motor, which is supplied with electrical energy by the fuel cell stack 100.

The fuel cell stack 100 comprises a plurality of (stacked) membrane electrode assemblies 10 and polar plates 12 arranged in an alternating sequence on the flat sides of the fuel cell, wherein the polar plates 12 are part of the polar plate assemblies 50 according to the invention. Overall, several stacked individual cells 11 thus form the fuel cell stack 100, wherein both the individual cell 11 and the fuel cell stack 100 can generally be called a fuel cell.

The polar plates 12 are designed as bipolar plates 14 if they are arranged between membrane electrode assemblies 10. The two polar plates 12 which are arranged between the membrane electrode assemblies 10 and the end plates 18 of the fuel cell stack 100 are called monopolar plates 16. Between the polar plates 12 and the respective membrane electrode assemblies 10 are arranged anode chambers and cathode chambers not shown, which are delimited by circumferential seals 20. In order to produce the sealing function of the seals 20, among other things, the fuel cell stack 100 is pressed in the stack direction S by means of tension elements 21, such as tie rods.

Figure 2:
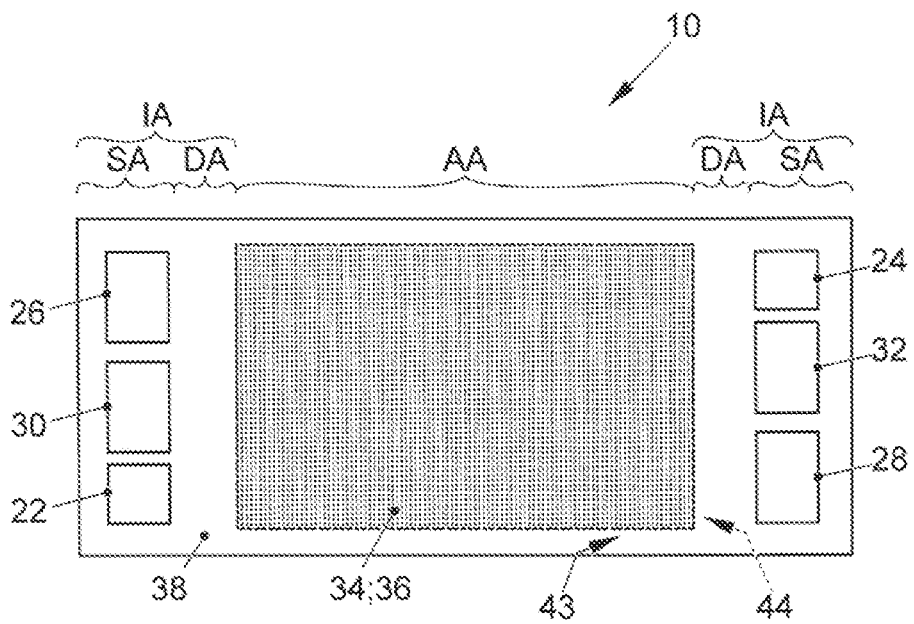
FIG. 2 shows a schematic top view of a membrane electrode assembly.
Figure 3:
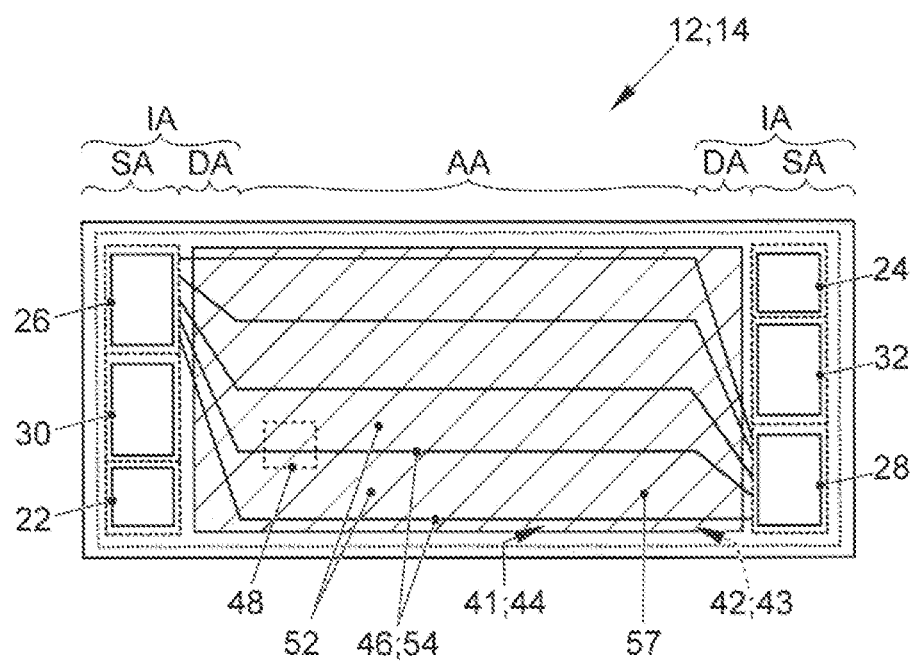
FIG. 3 shows a schematic top view of a polar plate.

The fuel cell stack 100 is penetrated through in the stack direction S by several main supply channels 102-112, which are formed within the fuel cell stack 10 by supply openings 22-32 of the membrane electrode assemblies 10 and polar plates 12 (see FIGS. 2 and 3).

FIG. 2 schematically shows a membrane electrode assembly 10 (MEA) with a membrane 34 and electrodes 36 arranged planarly on both sides of the membrane 34. The membrane electrode assembly 10 can furthermore comprise a film frame 38, which generally frames the membrane electrode assembly 10 on both sides in an overlapping manner.

FIG. 3 schematically shows a polar plate 12 and generally comprises a first single plate 41 and a second single plate 42, wherein only the first single plate 41 can be seen in FIG. 3; the second single plate 42 is hidden by the first single plate 41.

Both the membrane electrode assembly 10 and the polar plate 12 are divided into an active area AA and inactive areas IA. The active area AA is characterized by the fuel cell reactions taking place in this area. To this end, the membrane electrode assembly 10 comprises the catalytic electrodes 36 in the active area AA on both sides of the membrane 34 (an ion-conducting polymer electrolyte membrane). Gas diffusion layers (not shown in FIGS. 1 through 3) which are generally provided within the fuel cell 100 and arranged on both sides of the membrane electrode assembly 10 also generally have substantially the same extent as the active area AA. The (electrochemically) inactive areas IA can respectively be divided into supply areas SA and distributor areas DA. Within the supply areas SA, the supply openings 22 through 32 are arranged, which are substantially flush with each other in the stacked state and form the main supply channels 102 through 112 within the fuel cell stack 100 (see FIG. 1).

The MEA 12 comprises an anode side 43 that can be seen in FIG. 2. The illustrated catalytic electrode 36 is thus formed as anode on the anode side 43, for example as coating on the polymer electrolyte membrane. The cathode side 44, which is not visible in FIG. 2, comprises a corresponding catalytic electrode 36, in this case the cathode.

The polar plate 12, which is shown in FIG. 3 and which is designed as a bipolar plate 14, also comprises a cathode side 44, which is in this case however visible in the illustration and which is adjacent to the cathode side 44 of the membrane electrode assembly 10 within the fuel cell stack 100. The polar plate 12 furthermore comprises an anode side 43, which is not visible in FIG. 3 and which is adjacent to the anode side 43 of the membrane electrode assembly 10 within the fuel cell stack 100. On the visible flat side of the polar plate 12, open, in particular groove-like, channel structures are shown, which connect the cathode inlet opening 26 to the cathode outlet opening 28. Shown are only five exemplary channels 46, wherein a substantially higher number is generally provided. Instead of discrete channels 46, other structures could also be realized. Likewise, the anode side 43 (not visible here) of the bipolar plate 14 comprises corresponding channels, which connect the anode inlet opening 22 to the anode outlet opening 24. These channels for the anode operating medium are also designed as open, in particular groove-like, channel structures. Between the two single plates 41, 42 extend coolant channels which are encased within the polar plate 12 and connect the coolant inlet opening 30 to the coolant outlet opening 32.

FIG. 3 furthermore includes dashed lines showing a progression of seals 20, for example elastomer seals.

During operation of the fuel cell stack 100, the coolant flows in through a coolant main supply channel 110 on the inlet side and arrives via a coolant inlet opening 30 in a coolant cavity 66 (see FIG. 7) within the polar plate 12. After the coolant has flown through the coolant flow field, it leaves the fuel cell stack 100 again through a coolant outlet opening 32 and a coolant main supply channel 112 on the outlet side. In order to prevent an undesired escaping of the coolant, the single plates 41 and 42 are sealed toward each other.

An anode gas (i.e., fuel, for example hydrogen) enters the fuel cell stack 100 through an anode main supply channel 102 on the inlet side and arrives via an anode inlet opening 22 in the distributor area DA on the anode side 43 of the bipolar plate 14. Afterwards, the anode gas flows into the active area AA, penetrates through the adjacent gas diffusion layer (not shown), and takes part in the fuel cell reaction at the electrode 36. The remaining anode gas flows through the distributor area DA to an anode outlet opening 24 and leaves the fuel cell stack 100 via an associated anode main supply channel 104 on the outlet side. On the anode side 43 of the membrane electrode assembly 10, a sealing of an anode chamber toward the surroundings of the fuel cell stack 100 and toward the openings 22 through 32 takes place by seals 20, which are pressed onto the adjacent film frame 38 within the fuel cell stack 100.

On the cathode side 44 of the membrane electrode assembly 10, a cathode gas (in particular oxygen or an oxygen-containing mixture, preferably air) enters the fuel cell stack 100 through a cathode main supply channel 106 on the inlet side and arrives via a cathode inlet opening 26 in the distributor area DA on the cathode side 44 of the bipolar plate 30. Afterwards, the anode gas flows into the active area AA, penetrates through the adjacent gas diffusion layer, and takes part in the fuel cell reaction at the electrode (both not shown). The reaction products and remaining cathode gas flows through the distributor area DA to a cathode outlet opening 28 and leaves the fuel cell stack 100 via an associated cathode main supply channel 108 on the outlet side. On the cathode side 44 of the membrane electrode assembly 10, a sealing of a cathode chamber toward the surroundings of the fuel cell stack 100 and toward the openings 22 through 32 also takes place by seals 20, which are pressed onto the adjacent film frame 38 within the fuel cell stack 100.

The anode chambers and cathode chambers are sealed toward each other by the film frame 38 and the membrane electrode assembly 10.

Figure 4:
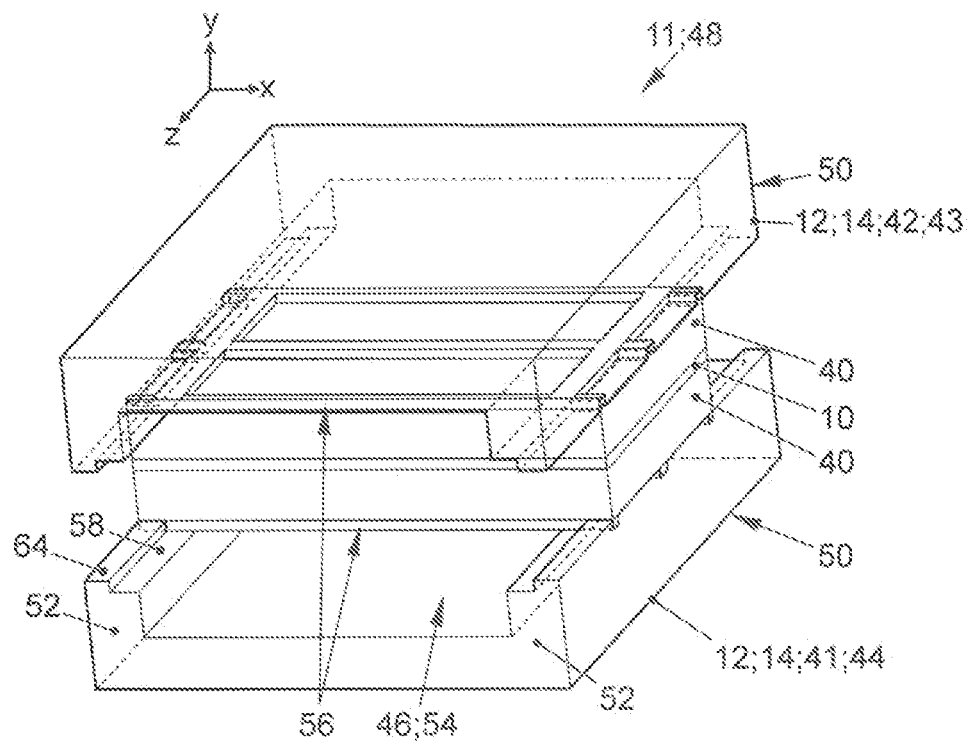
FIG. 4 shows a part of an individual cell according to a preferred embodiment of the invention.

FIG. 4 shows a subregion of an individual cell 11 according to the invention with a polar plate assembly 50 according to a preferred embodiment of the invention. In order to show the order of magnitude of the subregion, the subregion 48 is shown in FIG. 3 in relation to the polar plate 12. In FIGS. 4, 5, 6, 7, 9, and 10, coordinate systems are shown, the y direction of which corresponds to the stack direction S. In the subregions shown, the z direction furthermore corresponds to a direction of a longitudinal progression of a channel 46.

The membrane electrode assembly 10 is arranged between two gas diffusion layers 40. A polar plate assembly 50 each abuts against the gas diffusion layers 40.

The polar plate assembly 50 comprises one of the polar plates 12, which can be designed as a bipolar plate 14. In FIG. 4, only a single plate 42 of an anode side 43 of a first bipolar plate 14 and a single plate 41 of a cathode side 44 of a second bipolar plate 14 are shown. The single plates 41, 42 comprise elevations 52 and free spaces 54, which are arranged between them and which form a flow structure for a reactant. In the example shown, the elevations 52 are designed to be elongate so that the free spaces 54 form channels 46.

The polar plate assembly 50 comprises a supporting structure 56 designed to prevent or at least reduce an intrusion by the gas diffusion layer 40 adjacent to the supporting structure into the free spaces 54 of the flow structure. In areas of the individual cell 11 in which no gas diffusion layer 40 is provided, the supporting structure 56 can furthermore be designed to support the membrane electrode assembly 10.

The supporting structure 56 in particular covers the active area AA on the polar plate 12 in order to prevent an intrusion by the gas diffusion layer 40 into the free spaces 46. Additionally or alternatively, the supporting structure 46 can also extend along the distributor areas DA. In FIG. 3, an extent 57 of the supporting structure 56 comprising the active area AA and the distributor areas DA is shown shaded, without the supporting structure 56 itself being shown in detail.

Figure 5:
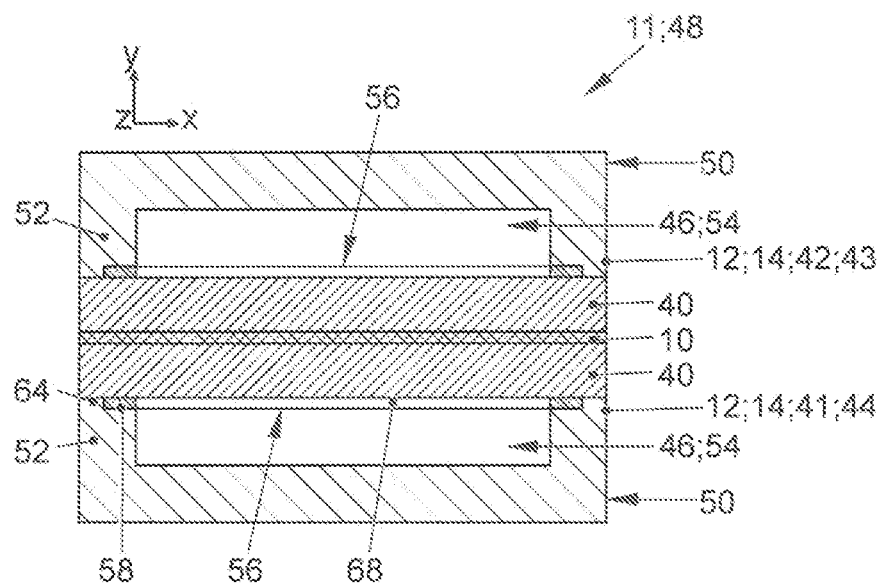
FIG. 5 shows a sectional view of the part of the individual cell.

FIG. 5 shows a sectional view of the subregion shown in FIG. 4. It can be seen that the polar plate 12 protrudes into the supporting structure 56. For this purpose, the elevations 52 can comprise depressions 58, on which the supporting structure 56 rests.

Figure 6:
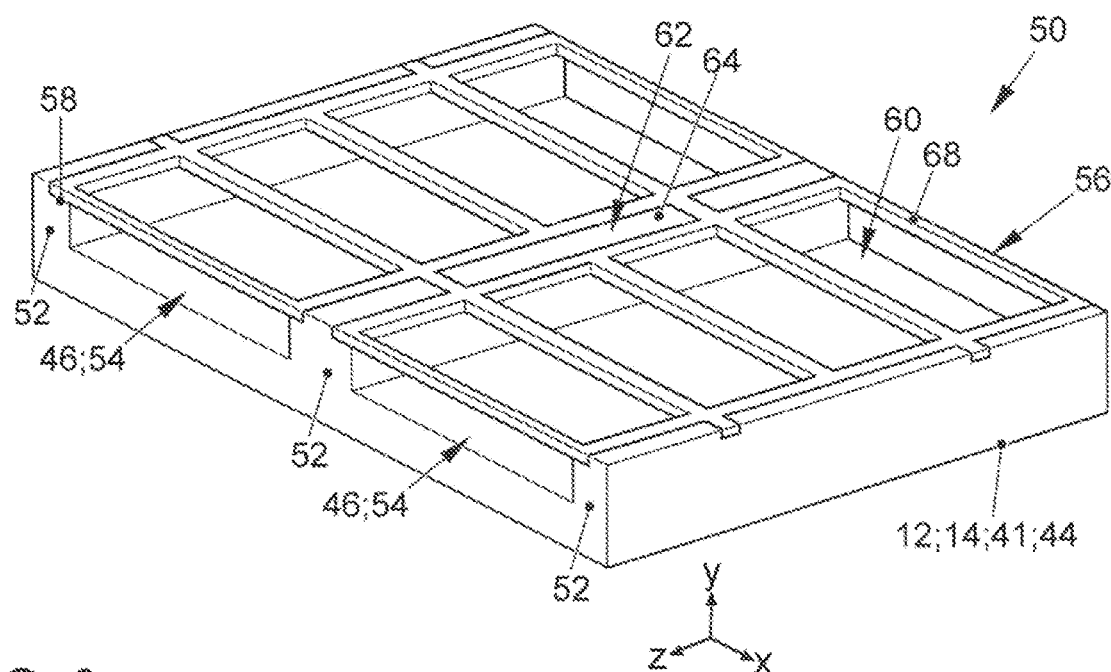
FIG. 6 shows a part of a polar plate assembly according to a preferred embodiment of the invention.

FIG. 6 shows an illustration of a part of a polar plate assembly 50 according to a preferred embodiment of the invention. Again, only a single plate 41 of the polar plate 12 is shown.

It can be seen that the supporting structure can also comprise, in addition to reactant openings 60, separate contact openings 62, into which the elevations 52 of the flow structure protrude into the supporting structure 56. The edges of the contact openings 62 can in this case rest circumferentially on the depressions 58 of the elevations 52 so that a force effect in the stack direction S results in circumferential support of the supporting structure 56 on the polar plate 12.

Subregions 64 of the elevations extending through the contact openings 62 respectively form a circumferential form fit with the contact openings 62 surrounding them.

FIG. 7 again shows a part of a polar plate assembly 50, wherein both single plates 41, 42 of a bipolar plate 14 are shown this time. On the outer flat sides of both single plates 41, 42, a supporting structure 56 is respectively arranged. In addition, a coolant cavity 66, which connects the coolant inlet opening 30 to the coolant outlet opening 32, is provided between the single plates 41, 42.

Figure 7:
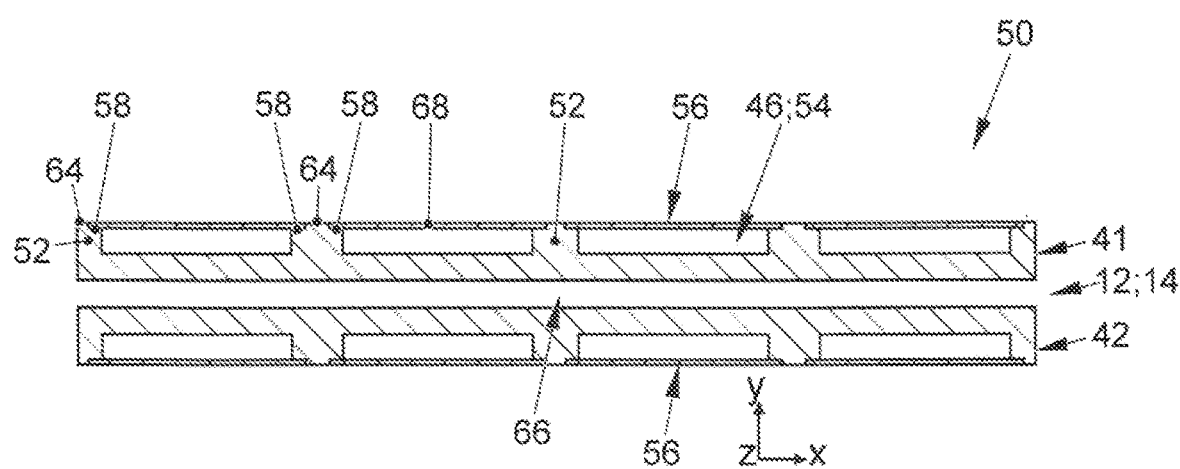
FIG. 7 shows a sectional view of a part of a polar plate assembly.

In particular when viewing FIGS. 6 and 7 together, it can be seen that the circumferential form fit of the elevations 52, in particular of the subregions 64, with the contact openings 62 surrounding them, bring about a stiffening of the polar plate 12, whereby its bending stiffness is increased.

The elevations 52 of the polar plate 12 can be flush with a side of the supporting structure 56 facing away from the polar plate 12. This ensures that, within the individual cell 11, the elevations 52 come into direct contact with the gas diffusion layers 40 (see FIG. 5), whereby the ohmic resistance between the polar plate 12 and the gas diffusion layer 40 is not increased despite the supporting structure 56.

In order to prevent the gas diffusion layer 40 from intruding into the free spaces 54 designed as channels 46, the supporting structure 56 comprises supporting means 68, which bridge the free spaces 54 between the reactant openings 60. The supporting means 68 in this case extend from an elevation 52 to a neighboring elevation 52. The supporting structure 56 thus forms a rest for a gas diffusion layer 40 and/or an adjacent membrane electrode assembly 10.

When viewing FIG. 3, it can be seen that the channels 46 do not have to extend linearly. In the active area AA, the channels can, for example, also have a sinusoidal progression. In order to take this into account, an arrangement of the supporting means 68 can adapt to a longitudinal progression of the channels 46. The supporting means 68 and reactant openings 60 thus "follow" the progression of the channels 46.

Figure 8:
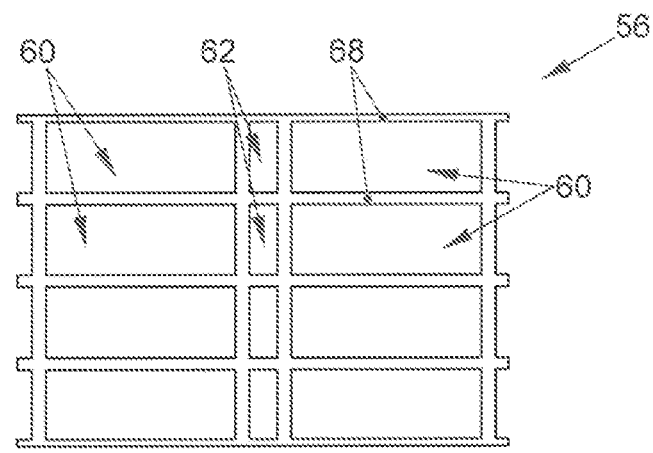
FIG. 8 shows a subregion of a supporting structure according to a preferred embodiment of the invention.

In FIG. 8, a subregion of a supporting structure 56 according to another preferred embodiment of the invention is furthermore shown separately. According to this embodiment, the supporting means 68 transition directly into areas which separate the contact openings 62 from one another. In the supporting structure 56 shown in FIG. 6, this is only the case for each second supporting means 68. It is furthermore possible to arranged local spring means.

The supporting structure 56 can generally be designed as a component separate from the polar plate 12. The supporting structure 56 can furthermore also be connected to the polar plate 12. A substance-to-substance bond by means of gluing or welding depending on the material of the supporting structure 56 and of the polar plate 12 lends itself to this purpose.

Figure 9:
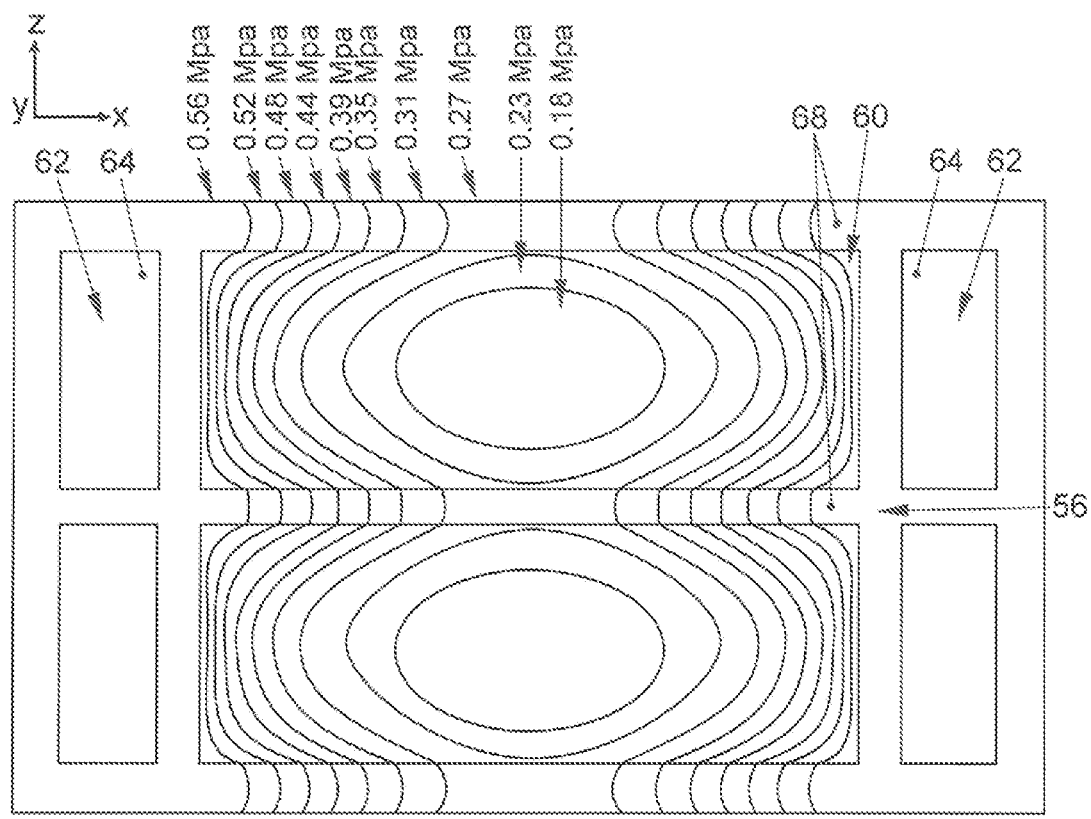
FIG. 9 shows a pressure pattern within a gas diffusion layer.

FIG. 9 shows a pressure pattern of a contact pressure between a gas diffusion layer 40 and a membrane electrode assembly 10 with reference to a polar plate assembly 50 with a supporting structure 56 according to FIG. 8. Even with a channel width, i.e., a width of the free spaces 54 between the elevations 52, of 1.4 mm, the contact pressure remains above 0.1 MPa (megapascal), i.e., above 100 kPa (kilopascal) in the center of the reactant openings 60. The pressure in the area of the elevations is 0.56 MPa and decreases toward the center of the supporting means 68 to 0.27 MPa.

Figure 10:
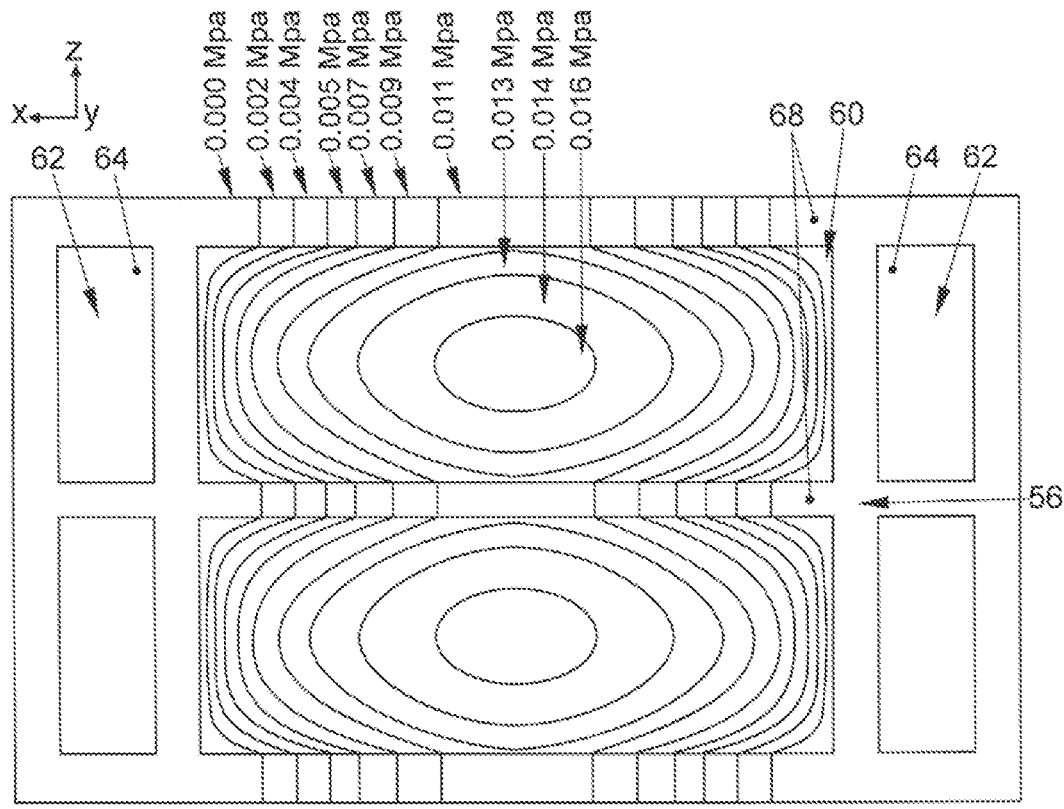
FIG. 10 shows an intrusion by a gas diffusion layer into a channel.

FIG. 10 also shows a progression of an intrusion by the gas diffusion layer 40 into the reactant openings 60 with reference to a polar plate assembly 50 with a supporting structure 56 according to FIG. 8. The maximum intrusion in the center of the reactant openings 60 is only 0.016 mm (millimeters), i.e., 16 µm (micrometers). Even if an intrusion of 0.011 mm is drawn in in the center of the supporting means 68, the supporting means 68 and the supporting structure 56 can nonetheless be called relatively rigid.

Figure 11:
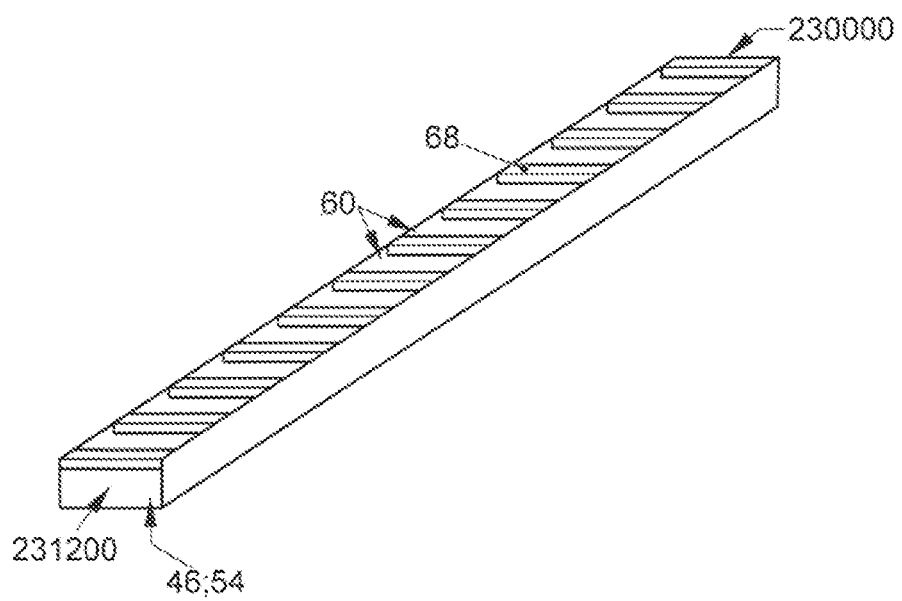
FIG. 11 shows a pressure pattern along a channel.

FIG. 11 finally shows a pressure pattern along a channel 46 on the cathode side 44. At the entrance of the channel, an absolute pressure Pabs of 231,200 MPa (231,200 N/mm$^2$) prevails, while a pressure of 230,000 MPa (230,000 N/mm$^2$) prevails at the outlet of the channel 46. With a channel width of 1.4 mm, approx. 70 channels are possible with a cell width of 120 mm. With a cell length of 350 mm, a pressure loss is only 260 hPA (260 mbar) (millibar), which meets current design requirements.

LIST OF REFERENCE SYMBOLS

10 Membrane electrode assembly
11 Individual cell
12 Polar plate
14 Bipolar plate
16 Monopolar plate
18 End plate
20 Seal
21 Tension element
22 Anode inlet opening
24 Anode outlet opening
26 Cathode inlet opening
28 Cathode outlet opening
30 Coolant inlet opening
32 Coolant outlet opening
34 Membrane
36 Electrodes
38 Foil frames
40 Gas diffusion layer
41 First single plate
42 Second single plate
43 Anode side
44 Cathode side
46 Channel
48 Subregion
50 Polar plate assembly 52 Elevations
54 Free spaces
56 Supporting structure
57 Extent of the supporting structure
58 Depression
60 Reactant opening
62 Contact opening
64 Subregion of the elevation extending through the contact opening
66 Coolant cavity
68 Supporting means/web
100 Fuel cell stack
102 Anode main supply channel on the inlet side
104 Anode main supply channel on the outlet side
106 Cathode main supply channel on the inlet side
108 Cathode main supply channel on the outlet side
110 Coolant main supply channel on the inlet side
112 Coolant main supply channel on the outlet side
AA Active area
IA Inactive area
SA Supply area
DA Distribution area
S Stack direction

The invention claimed is:

1. A polar plate assembly for a fuel cell, comprising:
a polar plate including a plurality of elevations and a plurality of free spaces arranged between the elevations, wherein the plurality of elevations and the plurality of free spaces form a flow structure for a reactant;
a gas diffusion layer; and
a supporting structure that reduces an intrusion of the gas diffusion layer into the free spaces of the polar plate,
wherein the supporting structure includes penetrating contact openings, and
wherein the elevations of the polar plate protrude into the penetrating contact openings of the supporting structure.

2. The polar plate assembly according to claim 1, wherein the elevations comprise depressions, on which the supporting structure rests.

3. The polar plate assembly according to claim 2, wherein the edges of the contact openings rest circumferentially on the depressions of the elevations.

4. The polar plate assembly according to claim 1, wherein subregions of the elevations, which subregions protrude into the contact openings, respectively form a circumferential form fit with the surrounding contact openings.

5. The polar plate assembly according to claim 1, wherein the elevations of the polar plate are flush with a side of the supporting structure facing away from the polar plate.

6. The polar plate assembly according to claim 1, wherein the supporting structure comprises supporting means designed to bridge the free spaces at least partially.

7. The polar plate assembly according to claim 6, wherein the flow structure forms channels and the supporting means are arranged one after the other along a longitudinal progression of the channels.

8. An individual cell for a fuel cell, comprising:
a membrane electrode assembly including a membrane, an anode on a first side of the membrane, and a cathode on a second side of the membrane opposite to the first side of the membrane;
a polar plate including a plurality of elevations and a plurality of free spaces arranged between the elevations, wherein the plurality of elevations and the plurality of free spaces form a flow structure for a reactant;
a gas diffusion layer between the membrane electrode assembly and the polar plate; and
a supporting structure that reduces an intrusion of the gas diffusion layer into the free spaces of the polar plate,
wherein the polar plate protrudes into the supporting structure and directly contacts the gas diffusion layer through the supporting structure.

* * * * *